(12) United States Patent
McLean

(10) Patent No.: US 8,918,574 B2
(45) Date of Patent: Dec. 23, 2014

(54) APPARATUS, SYSTEM, AND METHOD FOR DELIBERATELY PREVENTING UNAUTHORIZED ACCESS TO DATA STORED IN A NON-VOLATILE MEMORY DEVICE

(75) Inventor: James Gordon McLean, Fuquay-Varina, NC (US)

(73) Assignee: Lenovo Enterprise Solutions (Singapore) Pte. Ltd., Tech Park (SG)

( * ) Notice: Subject to any disclaimer, the term of this patent is extended or adjusted under 35 U.S.C. 154(b) by 1604 days.

(21) Appl. No.: 11/839,469

(22) Filed: Aug. 15, 2007

(65) Prior Publication Data

US 2008/0034405 A1 Feb. 7, 2008

Related U.S. Application Data

(62) Division of application No. 10/969,834, filed on Oct. 21, 2004, now Pat. No. 7,519,763.

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 1/16* | (2006.01) | |
| *H05K 5/00* | (2006.01) | |
| *H05K 7/00* | (2006.01) | |
| *G06F 21/79* | (2013.01) | |
| *G06F 12/14* | (2006.01) | |
| *G06F 21/86* | (2013.01) | |
| *G07F 7/08* | (2006.01) | |

(52) U.S. Cl.
CPC ............ *G06F 21/79* (2013.01); *G06F 12/1433* (2013.01); *G06F 21/86* (2013.01); *G07F 7/086* (2013.01); *G06F 2221/2143* (2013.01)
USPC ....... 711/100; 711/103; 711/163; 361/679.31

(58) Field of Classification Search
None
See application file for complete search history.

(56) References Cited

U.S. PATENT DOCUMENTS

| | | | | |
|---|---|---|---|---|
| 2,449,046 | A | * | 9/1948 | Barnes et al. ................. 229/233 |
| 4,236,463 | A | | 12/1980 | Westcott ......................... 109/33 |
| 4,811,288 | A | | 3/1989 | Kleijne et al. .................. 365/52 |

(Continued)

OTHER PUBLICATIONS

Solid-State Storage, http://computer.howstuffworks.com/removable-storage.htm as was cited on Aug. 3, 2004.

(Continued)

*Primary Examiner* — Aimee Li
*Assistant Examiner* — Gary W Cygiel
(74) *Attorney, Agent, or Firm* — Kunzler Law Group

(57) ABSTRACT

An apparatus, system, and method for deliberately preventing unauthorized access to data stored in a non-volatile memory device are disclosed. In one embodiment, an apparatus is configured to destroy the data stored on the memory device. The apparatus may comprise a printed circuit board (PCB), a non-volatile memory circuit electrically connected to the PCB, and a housing of the PCB. The non-volatile memory circuit may be scored to facilitate deliberately breaking the non-volatile memory circuit in response to an external force. In a further embodiment, the apparatus may comprise an electrical erase circuit powered by a power source connected to a switch. The electrical erase circuit may be configured to non-destructively erase the non-volatile memory circuit in response to activation of the switch. The system may further include a leverage tool configured to provide leverage to a non-volatile memory device affected by an external force.

16 Claims, 8 Drawing Sheets

(56) References Cited

U.S. PATENT DOCUMENTS

| | | | |
|---|---|---|---|
| 5,117,457 A | 5/1992 | Comerford et al. | 380/3 |
| 5,159,629 A | 10/1992 | Double et al. | 380/4 |
| 5,184,517 A * | 2/1993 | Kelzer | 73/851 |
| 5,233,505 A | 8/1993 | Chang et al. | 361/7.85 |
| 5,515,540 A | 5/1996 | Grider et al. | 395/750 |
| 5,790,670 A | 8/1998 | Bramlett | 380/52 |
| 5,861,662 A | 1/1999 | Candelore | 257/679 |
| 5,898,370 A * | 4/1999 | Reymond | 340/540 |
| 5,998,858 A | 12/1999 | Little et al. | 257/678 |
| 6,292,898 B1 | 9/2001 | Sutherland | 713/200 |
| 6,335,559 B1 * | 1/2002 | Charles | 257/620 |
| 6,484,945 B1 | 11/2002 | John et al. | 235/487 |
| 6,657,314 B2 | 12/2003 | Pockrandt | 257/922 |
| 2003/0105721 A1 | 6/2003 | Ginter et al. | 705/54 |
| 2004/0069883 A1 | 4/2004 | Watanabe et al. | 241/236 |

OTHER PUBLICATIONS

By Jeff Tyson, "How Flash Memory Works" http://computer.howstuffworks.com/flash-memory.htm as was cited on Aug. 3, 2004.

Weingart, Steve, "Physical Security Devices for Computer Subsystems: A Survey of Attacks and Defenses", 2000, Springer-Verlag, pp. 302-317.

Flash memory, Wikipedia, Printed Aug. 3, 2008, http://en.wikipedia.org/wiki/Flash_RAM.

Switch, Wikipedia, Printed Aug. 3, 2008, http://en.wikipedia.org/wiki/Switch.

* cited by examiner

APPARATUS, SYSTEM, AND METHOD FOR DELIBERATELY PREVENTING UNAUTHORIZED ACCESS TO DATA STORED IN A NON-VOLATILE MEMORY DEVICE

PRIORITY APPLICATIONS

This application is a divisional application that claims priority benefit of U.S. patent application Ser. No. 10/969,834, filed Oct. 21, 2004 now U.S. Pat. No. 7,519,763, by James Gordon McLean, titled "Apparatus, System, and Method for Deliberately Preventing Unauthorized Access to Data Stored in a Non-volatile Memory Device," which is incorporated herein by reference in its entirety.

BACKGROUND OF THE INVENTION

1. Field of the Invention

This invention relates to portable external memory devices. Specifically, the invention relates to apparatus, systems, and methods for deliberately preventing access to data stored in a non-volatile memory device.

2. Description of the Related Art

Computer users frequently use portable storage devices such as universal serial bus (USB) keys and Smart Cards for storage and transfer of computer data. Portable storage devices interoperate with host computers to store and retrieve data. Data is typically stored on the portable storage device in non-volatile memory. A portable storage device may be disconnected from a power source such as a host computer without losing data stored in the non-volatile memory. Portable storage devices assist in many activities, including data transport, data backup, and data security.

Data security is perhaps one of the most important uses of portable storage devices. Large amounts of confidential data may be downloaded from a host computer to a portable storage device for transport. During transfer, the data does not travel over the Internet and is not accessible by networking technology. Once transport is complete, the portable storage device is connected to a host computer and the user can access the stored data. The portable storage device may be disconnected from the host computer and kept in a vault or other secure location, completely isolated from a computer network.

Sensitive files such as a company's private key, confidential designs, encryption algorithms, and strategic plans may be securely stored on portable storage devices. By storing data only onto a portable storage device, security issues related to storing sensitive data on a hard drive can be avoided. Even when a computer system deletes files from a hard drive, the data may be recovered from the drive with sophisticated data recovery programs and techniques.

Portable storage devices may be used to facilitate secure transport of data from one computer to another. It is often convenient to save data from a host computer onto a portable storage device for transport. Although network transport across the Internet or across a company intranet may also be used, many people prefer to use a portable storage device for transporting important files in certain situations. As an example, an employee taking a trip to a new city may not know where the employee will be working in the new city. It would be impossible to send the data to a destination computer that is unknown at the beginning of the trip. By carrying the important data on a portable storage device, the data travels with the employee and is available at whatever computer the employee finally uses.

Portable storage devices also serve data backup purposes. A home user may store a backup copy of financial data onto a portable storage device as part of a data protection plan. Portable storage devices use non-volatile memory technologies that do not lose data due to power surges or power outages. In addition, archival copies of data files may be stored on portable storage devices. Modern portable storage devices are small and may hold many hundreds of megabytes worth of data. Multiple versions of a single archive may be stored on a single portable storage device.

As portable storage devices become more common, administrators worry that data stored on the portable storage devices may be stolen or misused. Certain conventional devices provide means for destroying data on portable storage devices in response to tampering with the device. Efforts to disassemble devices cause certain devices to become nonfunctional. However, these conventional devices do not address the need to deliberately quickly, and actively destroy data on a portable memory device.

Other conventional devices facilitate the destruction of circuitry used for memory access. Such devices may destroy the circuitry normally used to access data on the device or may even partially destroy a chip used for storing data on the device. However, such devices do not ensure that memory stored in the memory chip itself will be completely destroyed. Individuals intent on gaining unauthorized access to data on such a memory device may remove the memory chip and recover portions of the data using sophisticated probing equipment. These portions of data may be sufficient to disclose confidential information the portable storage device owner believed was destroyed. These devices also do not allow for the manual, deliberate, and logical erasing of data on the portable storage device such that the device may be reused in the future.

As an example, an embassy data officer may be charged with the safekeeping of embassy data files. The data officer may safeguard portable storage devices containing encryption algorithms, top secret treaties, and strategic operations plans. The data officer would be charged with destroying the portable data devices if the embassy's security is threatened. The data officer would need to quickly and effectively either erase the devices or destroy them in such a way that no data would be retrievable from the devices. The data officer may need to be able to do this quickly without use of a host computer.

As another example, a retail movie rental company may store movies, games, or other digital content on portable storage devices for use by customers. When the portable storage device is returned, or when a title is taken out of circulation (i.e., Due to an expired licensing agreement), it would be important to prevent the device from being used again if the device is discarded to protect the copyrighted movie on the device. This could be done either by erasing the device or by destroying the memory chips on the device. The clerk who receives the returned rental unit may need to disable the portable storage device quickly and without the use of a host computer.

Under ordinary circumstances, a portable memory device is returned to the host computer for data erasure. Any host computer capable of writing data to a portable memory device can also erase the data on a portable memory device. This process can be time consuming. The host computer needs to be powered on. The computer needs to individually erase each device. Complete erasure requires the host computer to access all storage bytes on the device. However, some situations require that a portable memory device be erased quickly and securely without the use of a host computer. The embassy data officer may need to erase or disable several devices before an impending coup. The video rental clerk may need to quickly erase or disable a rentable portable storage device. Following the grading of a test stored on several hundred USB memory keys, a professor may want to erase the memory keys quickly and deliberately to guard test answers from inadvertent disclosure.

In each of these scenarios, the ability to deliberately and quickly destroy the data in a portable memory device without the use of a host computer is highly desirable. Consequently, a need exists for a process, apparatus, and system that allow for the quick, deliberate, and efficient prevention of access to data stored on portable memory devices without the assistance of a host computer. Such a system must either completely erase the memory on a portable storage device or completely destroy the memory circuitry that holds the data on such a device in such a way that no data may be retrieved from the device. Beneficially, such a process, apparatus, and system would reduce the time needed to clear such devices and ensure that data on such devices not be used improperly.

SUMMARY OF THE INVENTION

The present invention has been developed in response to the present state of the art, and in particular, in response to the problems and needs in the art that have not yet been fully solved by currently available portable non-volatile memory devices. Accordingly, the present invention has been developed to provide an apparatus, system, and method for deliberately preventing unauthorized access to data stored in a non-volatile memory device that overcome many or all of the above-discussed shortcomings in the art.

An apparatus for deliberately preventing unauthorized access to data stored in a non-volatile memory device, in one embodiment, is configured to destroy the data stored on the memory device. The apparatus may comprise a printed circuit board (PCB), a non-volatile memory circuit electrically connected to the PCB, and a housing of the PCB. The non-volatile memory circuit may be scored to facilitate deliberately breaking the non-volatile memory circuit in response to an external force. In addition, the PCB and the housing may also be scored.

The apparatus, in a further embodiment, may be configured to non-destructively erase the non-volatile memory circuit. The apparatus may include a power source, a switch, and an electrical erase circuit disposed on the PCB. The electrical erase circuit may be electrically connected to the non-volatile memory circuit. In response to activation of the switch, the electrical erase circuit may supply a signal to the non-volatile memory circuit that non-destructively erases the non-volatile memory circuit. In one embodiment, the electrical erase circuit overwrites the non-volatile memory circuit by writing a first and second data pattern to the non-volatile memory circuit. The apparatus is further configured, in one embodiment, to include a computer interface disposed on the PCB that enables a host computer to store and retrieve data on the non-volatile memory circuit.

A system of the present invention is also presented for preventing unauthorized access to data stored in a non-volatile memory device. The system may include a host computer, a computer interface, and a non-volatile memory device. The non-volatile memory device may be configured to store and retrieve data from the host computer through the computer interface.

In addition, the non-volatile memory device may include a PCB, a housing, and a non-volatile memory circuit electrically connected to the PCB. The non-volatile memory circuit may include a first scoring configured to allow the memory circuit to readily break along the first scoring in response to an external force. A second scoring on the PCB and a third scoring on the housing may be aligned with the first scoring such that the PCB and the housing break along the second and third scorings respectively in response to the external force. In certain embodiments, the system may further include a switch, a power source, and an electrical erase circuit configured to supply a signal to the non-volatile memory circuit that non-destructively erases the non-volatile memory circuit in response to activation of the switch.

The system may further include a leverage tool to securely retain the non-volatile memory device while an external force is applied to the device. The leverage tool may include a top surface and an opening to receive the non-volatile memory device. In one embodiment, the top surface comprises a fulcrum, and the opening aligns the first, second, and third scorings with the fulcrum such that the application of the external force to the non-volatile memory device creates a leveraged force that separates the scorings at the fulcrum.

In one embodiment, an apparatus for deliberately preventing unauthorized access to data stored on a non-volatile memory device is provided. The apparatus includes a non-volatile memory such as a magnetic strip, bar code, Radio Frequency Identification (RFID) tag or the like. The non-volatile memory includes a first scoring configured such that the non-volatile memory readily breaks along the first scoring in response to an external force. The apparatus further includes a planar housing configured to support the non-volatile memory. The housing includes a second scoring aligned with the first scoring, the first scoring and second scoring running transverse to the edges of the housing.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
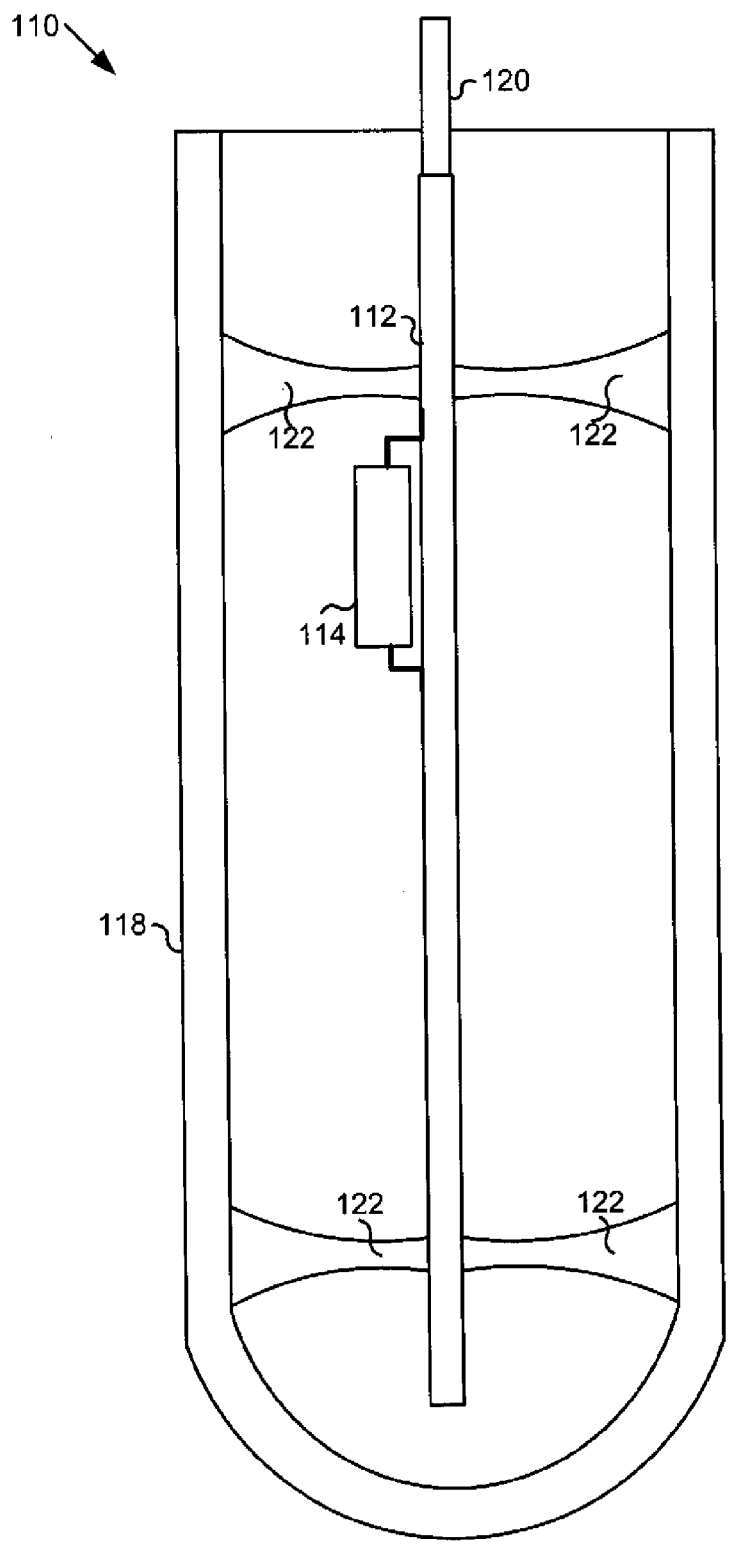
FIG. 1 is a side cross-section view of one embodiment of a conventional non-volatile memory device.

FIG. 1 depicts a non-volatile memory device 110 suitable for use with the present invention. The memory device 110 may comprise a solid-state device configured to store data in persistent memory. Many different types of non-volatile memory devices exist today including Smart Cards and Universal Serial Bus (USB) memory devices. Although the present invention is described in relation to a USB memory device 110, those of skill in the art will recognize various other types of non-volatile memory devices 110 compatible with the present invention.

The non-volatile memory device 110 may include a printed circuit board (PCB) 112, a non-volatile memory circuit 114 disposed on the PCB 112, a housing 118, and a computer interface 120. The PCB 112 may be a generally planar, rectangular piece of plastic with attached electrical lines that interconnect to form an electrical circuit. Typically, the PCB 112 includes pre-formed holes that receive pins of electrical components that may be soldered to the PCB 112 to form an electrical circuit. The PCB 112 may comprise a thin plastic substrate encasing electrical leads.

Various electrical components may be connected to the electrical circuit via the PCB 112. In conventional non-volatile memory devices 110, a non-volatile memory circuit 114 is typically connected to the PCB 112 and stores computer data. The non-volatile memory circuit 114 stores data without relying on external or internal power sources to maintain the integrity of the data. In one embodiment, the non-volatile memory circuit 114 comprises a Static Random-Access Memory (SRAM), flash memory chip or other type of electrically-erasable programmable read only memory (EEPROM) device. Flash memory enables rapid storage and retrieval of data. The non-volatile memory circuit 114 may be a single chip disposed on the PCB 112, or a combination of chips and circuitry disposed on the PCB 112. Generally, a host computer with a power source (not shown) is required to write data to and retrieve data from the non-volatile memory circuit 114. The host computer typically connects to the electrical circuit of the PCB 112 through the computer interface 120.

The computer interface 120, in the depicted embodiment, comprises a USB interface that can be inserted into a USB port of a host computer. Alternatively, the computer interface 120 may comprise a Smart Card reader interface or other type of computer interface suitable for interacting with a non-volatile memory device 110. Consequently, data files may be effectively transmitted between the host computer and the non-volatile memory device 110. Data stored on the host computer can be transferred to the non-volatile memory device 110 and vice versa. Typically, the non-volatile memory device 110 may be disconnected physically and electrically from the host computer without loss of data stored on the non-volatile memory circuit 114.

The non-volatile memory circuit 114 and PCB 112 are generally encased in a housing 118. The housing 118 protects the delicate circuit wires and memory chips attached to the PCB 112. In certain embodiments, the housing 118 comprises a hard plastic shell similar to a small enclosed container. Alternatively, as in the case of a Smart Card interface 120, the housing 118 may comprise a flat plastic card. In one embodiment, the PCB 112 is connected to the housing 118 by housing mounts 122, which may be extensions of the housing 118. The housing mounts 122 maintain the PCB 112 in a fixed position conducive to interaction with a host computer. Various elements discussed in relation to FIG. 1 may be included in the description of FIGS. 2-6.

Figure 2:
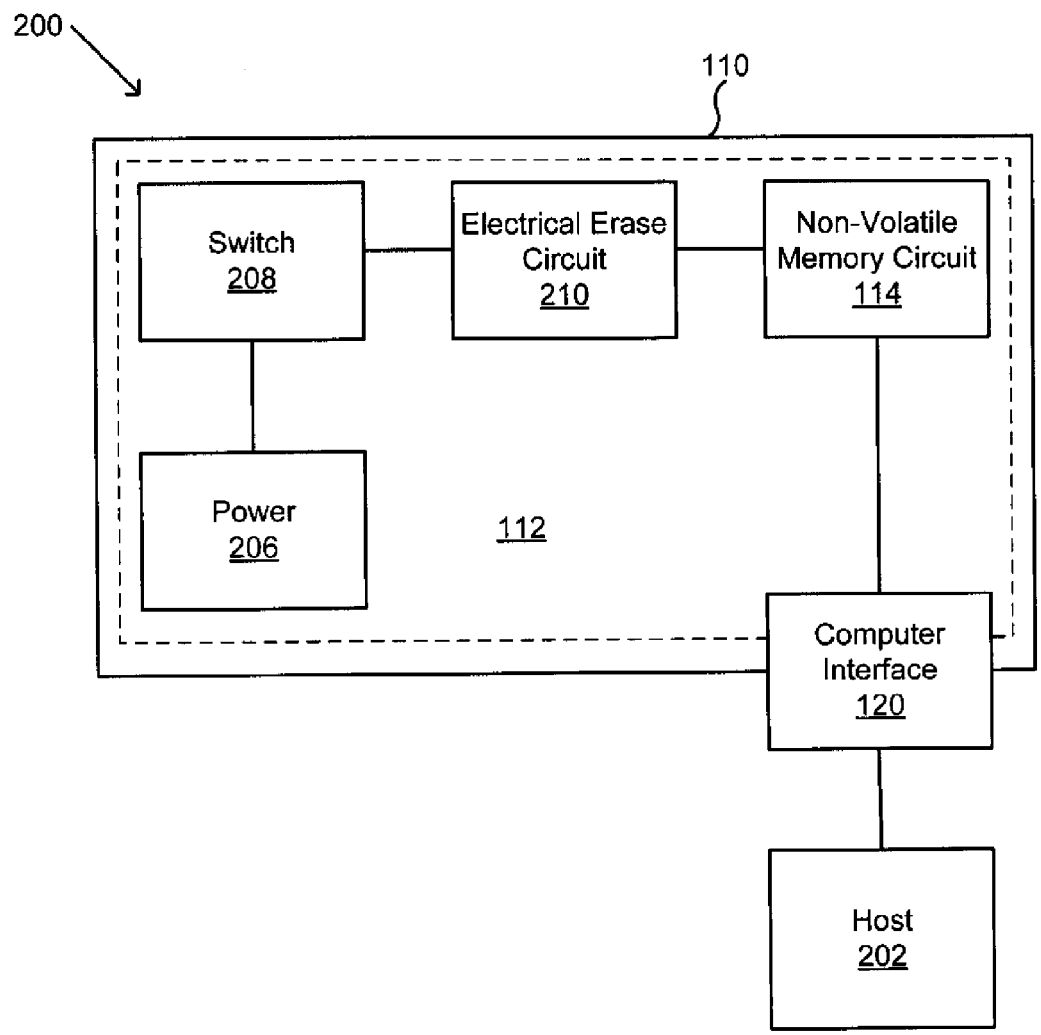
FIG. 2 is a schematic block diagram illustrating one embodiment of a system for deliberately preventing unauthorized access to data stored in a non-volatile memory device in accordance with the present invention.

FIG. 2 illustrates one embodiment of a system 200 for deliberately preventing unauthorized access to data stored in a non-volatile memory device 110. The system 200 may include a host computer 202, a computer interface 120, and a non-volatile memory device 110. The non-volatile memory device 110 may include a PCB 112, a non-volatile memory circuit 114, a power source 206, a switch 208, and an electrical erase circuit 210. As discussed previously, the host computer 202 accesses the non-volatile memory circuit 114 via the computer interface 120. When a host computer 202 interfaces a non-volatile memory device 110, the host computer 202 generally provides the electrical signals required to erase or store data on the non-volatile memory circuit 114.

In order to permit the user to alter the non-volatile memory circuit 114 without the use of a host computer 202, the system 200 may provide alternative ways of affecting the non-volatile memory circuit 114. In the depicted embodiment, an electrical current provided by a power source 206 located within the non-volatile memory device 110 powers an electrical erase circuit 210 that alters the data stored on the non-volatile memory circuit 114. The electrical erase circuit 210 preferably operates when connected to the power source 206 through the switch 208. Alternatively, the power source 206 may be directly connected to the electrical erase circuit 210; in this configuration an instantaneous change in state of switch 208 may create a signal which activates the function of the electrical erase circuit 210.

The power source 206 may be a battery known in the art. The negative terminal of the battery may be connected to ground while the positive terminal of the battery may be connected to the switch 208. Preferably, the battery provides sufficient energy to power the electrical erase circuit 210, but not enough power to overload the circuitry in the non-volatile memory device 110.

The activation of the switch 208 preferably requires a deliberate action of the user to intentionally erase data on the non-volatile memory device 110. When the switch 208 is not activated, the non-volatile memory device 110 remains unaffected by the internal power source 206. However, when the switch 208 is intentionally activated, or closed, the electrical erase circuit 210 preferably applies an electrical signal to the non-volatile memory circuit 114 to non-destructively erase the data in the non-volatile memory circuit 114.

"Non-destructively erase" as used herein means that the data stored on the non-volatile memory device 110 is overwritten in such a way that the original data is no longer accessible and also that the underlying memory circuitry remains usable. Some erasing techniques apply voltages that destroy the underlying circuitry and make that circuitry unusable for future memory storage. "Non-destructively erase" indicates that the original stored data is no longer retrievable, but that the non-volatile memory device 110 itself may be reused for storing data. The electrical signals used to non-destructively erase the non-volatile memory circuit 114 will be discussed in greater detail in relation to FIGS. 3-5.

In one embodiment, the electrical erase circuit 210 alters the non-volatile memory circuit 114 by transmitting a signal configured to reset the non-volatile memory circuit 114. In an alternative embodiment, the signal is configured to logically overwrite the data in the non-volatile memory circuit 114. Preferably, the signal is configured to cause the reset or overwrite of the non-volatile memory circuit 114 without damaging any electrical circuitry.

Figure 3:
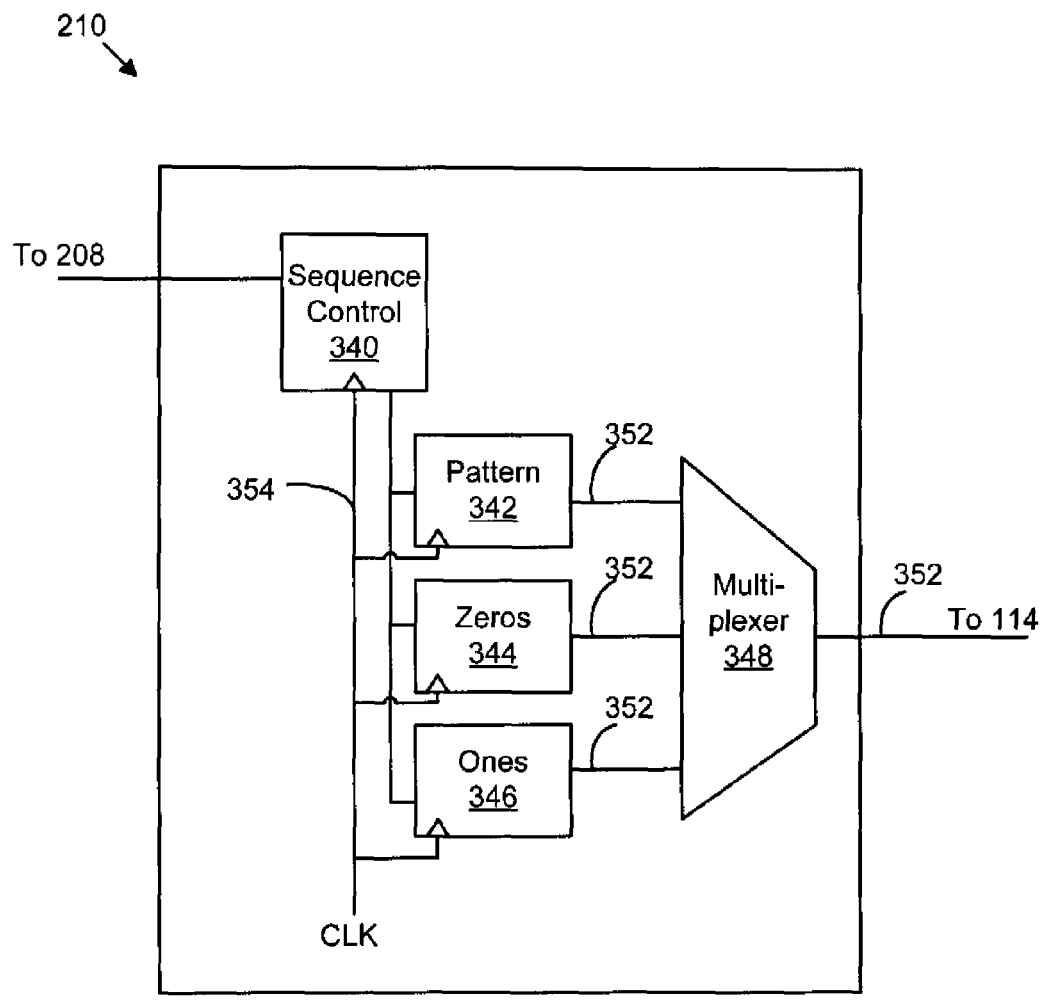
FIG. 3 is an electrical diagram of one embodiment of an electrical erase circuit in accordance with the present invention.

FIG. 3 illustrates one embodiment of an electrical erase circuit 210 configured to logically overwrite the data stored in the non-volatile memory circuit 114. The electrical erase circuit 210 comprises a sequence controller 340; logical patterns 342, 344, 346; data lines 352; and a multiplexer 348. In certain embodiments, the electrical erase circuit 210 logically overwrites memory in the non-volatile memory device 110 by writing one or more data patterns to the non-volatile memory circuit 114. The data patterns may include, by way of example, a predefined pattern 342, a simple zeros pattern 344, and a simple ones pattern 346, and/or a combination of these. The data patterns 342, 344, 346, may be communicated to the non-volatile memory circuit 114 across the data lines 352. In certain embodiments, the data patterns are regulated by the sequence control 340 and a clock line 354. The multiplexer 348 may combine the various patterns into a single signal that is sent to the non-volatile memory circuit 114. Alternatively, a randomly-generated pattern may be created in real time such that an unpredictable and unrepeatable set of data replaces the original data on the device. The precise design of such logic circuitry implemented may vary and is well known to those skilled in the art.

In one embodiment, the switch 208 sends a signal to the sequence control 340. The sequence control 340 may be programmed to send a series of different data sequences to each memory location within the non-volatile memory circuit 114. Consequently, the sequence control 340 may initiate the logical pattern component 342 which sends a pre-programmed combination of ones and zeros to the multiplexer 348 which in turn communicates the pattern to each memory location in the non-volatile memory circuit 114. Additionally, the sequence control 340 may similarly signal the zeros component 344 and one component 346 to respectively send a series of all zeros and ones to the memory locations.

Preferably, the sequence control 340 ensures that each memory location of the non-volatile memory circuit 114 is overwritten at least once such that all data on the non-volatile memory circuit 114 is completely destroyed. The multiplexer 348 ensures that each memory location is overwritten. In this manner, complete logical destruction of each data value previously stored is accomplished.

Figure 4:
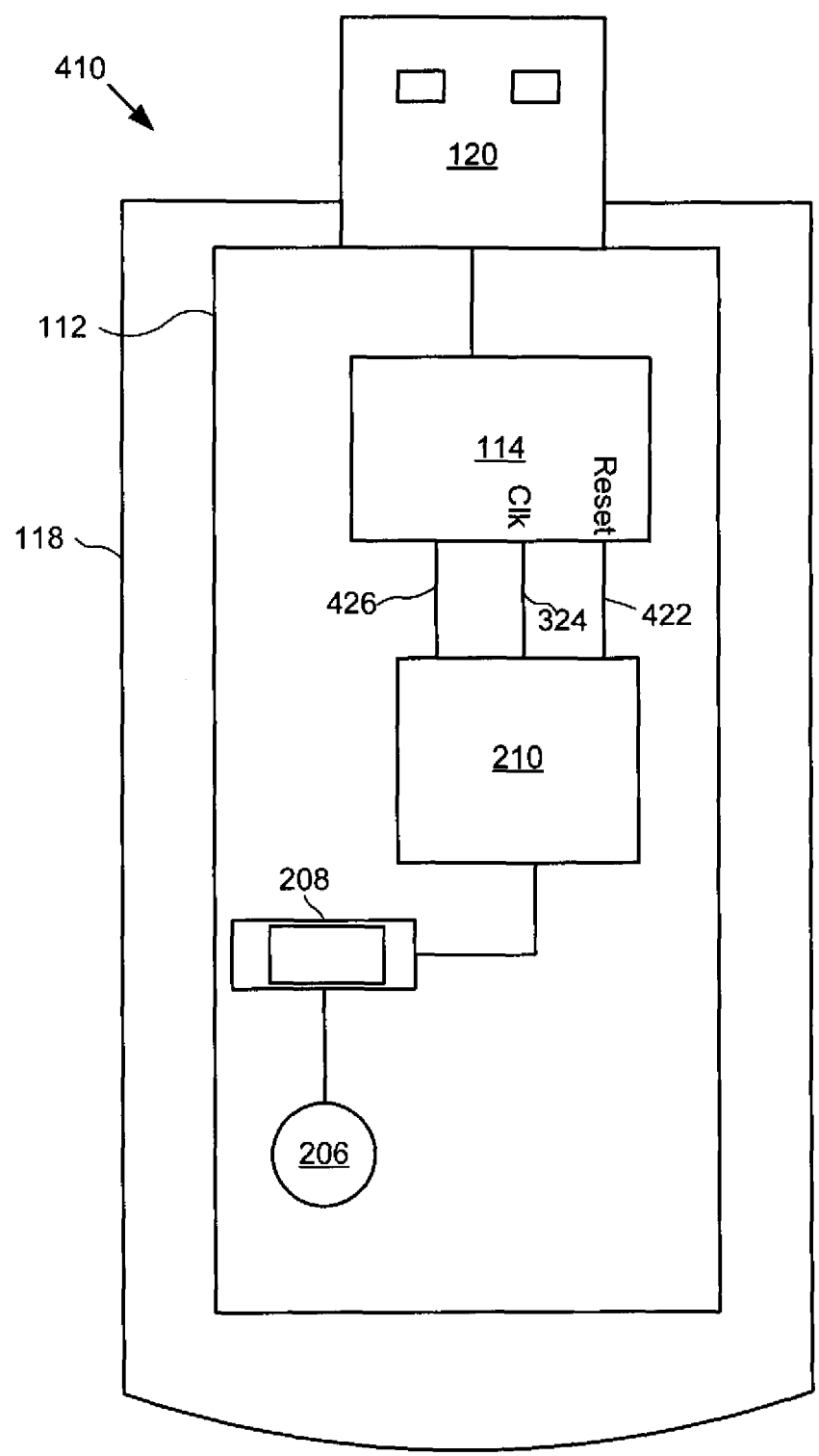
FIG. 4 is a top plan view of one embodiment of an apparatus for non-destructively erasing data within a non-volatile memory device in accordance with the present invention.

FIG. 4 illustrates in further detail one embodiment of a non-volatile memory device 410 comprising an electrical erase circuit 210 for non-destructively erasing a non-volatile memory circuit 114. The non-volatile memory device 410 comprises a PCB 112, a non-volatile memory circuit 114, a computer interface 120, and a housing 118. The non-volatile memory device 410 further includes a power source 206, a switch 208, an electrical erase circuit 210, and a variety of electrical signals 422, 424, 426. In certain embodiments, the electrical erase circuit 210 applies an electrical signal to the non-volatile memory circuit 114 over a plurality of data lines including a reset line 422, and a data line 426. The clock line 424 ensures synchronized operation. In one embodiment of the invention, the electrical erase circuit 210 erases the data in the non-volatile memory circuit 114 by applying an appropriate voltage to the reset line 322 of the non-volatile memory circuit 114 to cause the memory to be cleared. The voltage strength is configured to perform the reset without damaging the non-volatile memory circuit 114.

The operation and interaction of these elements are similar to the interactions of the corresponding elements described above with respect to FIG. 3. Namely, if necessary, a user deliberately activates the switch 208. Power is then supplied by the power source 206 to the electrical erase circuit 210. In one embodiment, the electrical erase circuit 210 may simply raise the reset line 422 high. Within the non-volatile memory circuit 114, raising the reset line 422 high may cause a one value to be written to each memory location to erase the memory. Alternatively, as discussed above, more complicated erase data patterns may be written to the non-volatile memory circuit 114.

Figure 5:
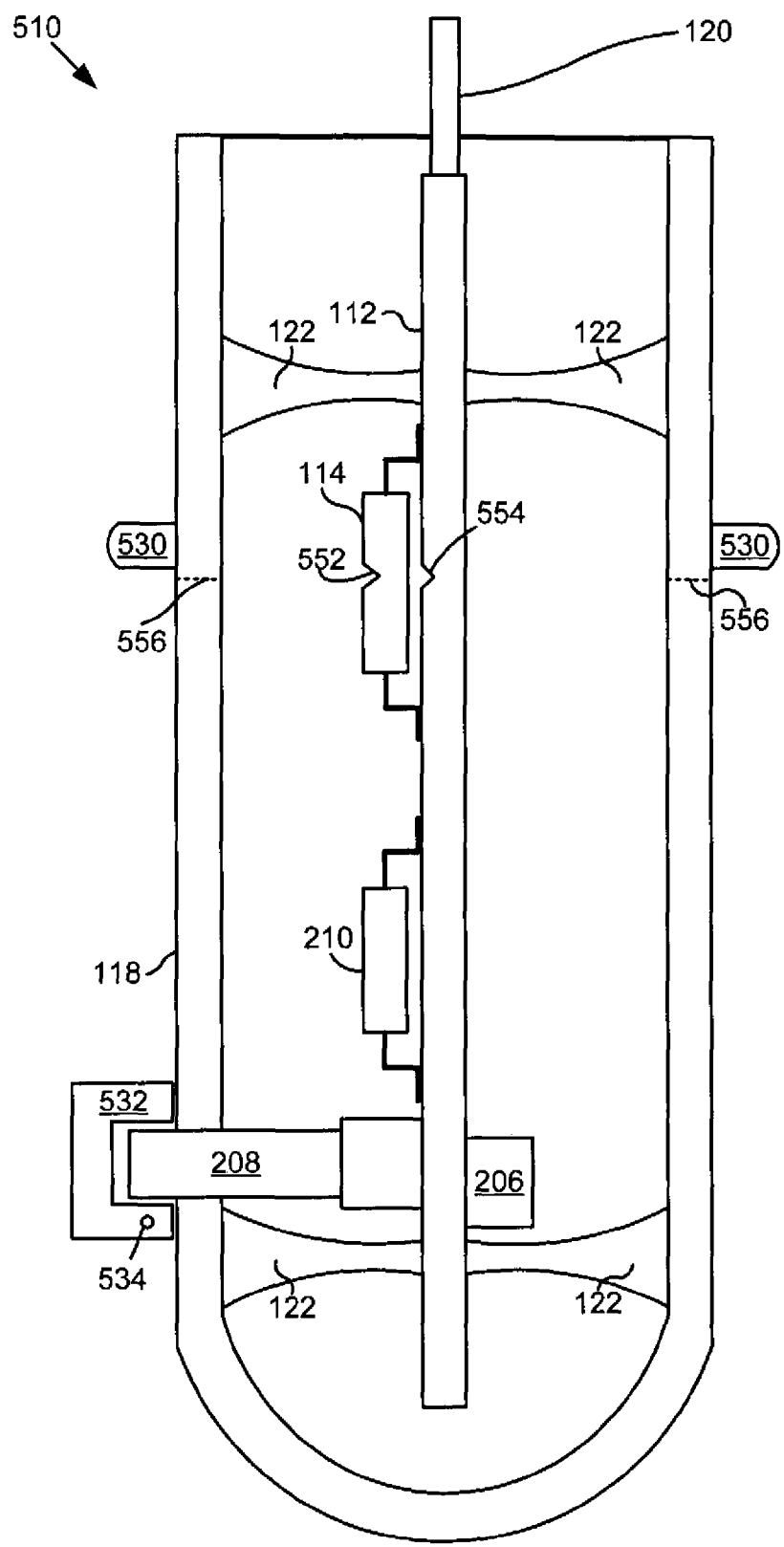
FIG. 5 is a side cross-section view of an alternative embodiment of an apparatus for deliberately preventing unauthorized access to data stored in a non-volatile memory device in accordance with the present invention.

FIG. 5 illustrates one embodiment of a non-volatile memory device 510 with a scored PCB 112, non-volatile memory circuit 114, and housing 118. The scoring facilitates destroying the non-volatile memory device 510. The non-volatile memory device 510 also enables the user to deliberately prevent unauthorized access to data stored in the non-volatile memory device 510 by non-destructively erasing the non-volatile memory circuit 114 as desired.

In one embodiment, an electrical erase circuit 210 is disposed on the PCB 112 and is electrically connected to the non-volatile memory circuit 114. A battery 206 that provides power to the electrical erase circuit 210 through electrical switch 208 may also be disposed on the PCB 112. The electrical switch 208 may be formed as a button extending through the housing 118 as shown.

In a further embodiment of the switch 208, a cover 532 may extend over the exposed portion of the switch 208 to prevent unintentional activation of the switch 208. The cover 532 must be removed before the switch 208 may be activated. The cover 532 may include a hinge 534 to facilitate exposing the switch 208. In an alternative embodiment (not shown), the electrical switch 208 may rest just under the housing 118 in such a way that squeezing the housing 118 will activate the switch 208. In a further alternative embodiment (not shown) the cover 532 may comprise a removable shield or tab that may be permanently broken off or removed to attain access to the switch 208. The operation of the switch 208, the electrical erase circuit 210, and the battery 206 to erase the data in the non-volatile memory circuit 114 is similar to that described above with respect to FIGS. 2, 3, and 4.

FIG. 5 further illustrates a non-volatile memory circuit 114 shown as a single computer chip disposed on the PCB 112 and logically connected to the computer interface 120. In one embodiment, the non-volatile memory circuit 114 is manufactured with a first scoring 552. The first scoring 552 is configured such that the non-volatile memory circuit 114 will break along the scoring 552 in response to the application of an external force. Physically breaking the memory circuit 114 severely inhibits retrieval of data from the memory circuit 114, ensuring protection of any data stored in the memory circuit 114.

The non-volatile memory device 510 may also be manufactured with a second scoring 554 aligned with the first scoring 552. The second scoring 554 may be on either or both sides of the PCB 112 to allow the PCB 112 to break in response to an external force. Similarly, the housing 118 may include a third scoring 556 aligned with the first and second scorings 552, 554, which allows the housing 118 to break in response to an external force. The alignment of the three scorings 552, 554, 556 allows all three scorings 552, 554, 556 to readily break by the application of a single external force, ensuring that data on the memory device 510 is protected from access by unauthorized persons.

The housing 118 may further be configured with housing tabs 530 aligned and positioned just above or below the various scorings 552, 554, 556 already mentioned. The tabs 530 facilitate alignment of the scorings 552, 554, 556 with structures for breaking the device 510 and are described in greater detail in relation to FIG. 6.

FIG. 5 as illustrated depicts two methods for preventing unauthorized access to data stored in the non-volatile memory circuit 114. As described above, one method configures the memory circuit 114 to readily break along a scoring 552 in response to an external force. The second method non-destructively purges memory through the application of a signal to the non-volatile memory circuit 114. An embodiment of the invention may implement one or both of these methods to prevent unauthorized access to data stored in the non-volatile memory device.

Those of skill in the art will readily recognize that a non-volatile memory device 510 may take various shapes forms and configurations including, but not limited to, pen drives, USB drives, smart cards, and the like. The present invention is intended to extend to all such devices and is defined by the claims that follow.

Figure 6:
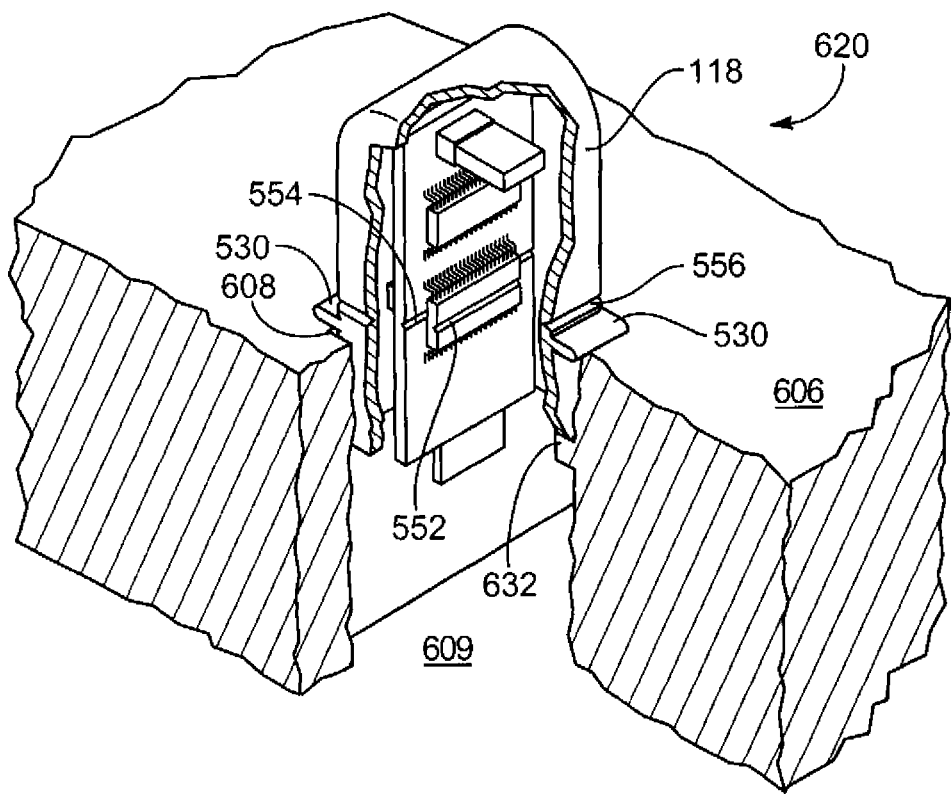
FIG. 6 is a perspective view of one embodiment of an apparatus for deliberately preventing unauthorized access to data stored in a non-volatile memory device inserted into a leverage tool in accordance with the present invention.

FIG. 6 illustrates one embodiment of a non-volatile memory device 610 for insertion into a leverage tool 620. The non-volatile memory device 610 may be similar to the non-volatile memory device 510 of FIG. 5.

The leverage tool 620 is formed with a top surface 606. The top surface 606 has an opening 604 sized to allow the non-volatile memory device 610 to be inserted into the opening 604. The non-volatile memory device 610 has optional depth tabs 530 attached to the outer surface of the housing 118 and aligned with the first, second, and third scorings 552, 554, 556. As the non-volatile memory device 114 is inserted into the opening 604, the depth of the insertion is controlled by the depth tabs 530 to ensure that the scorings 552, 554, 556 are aligned with the top surface 606 of the leverage tool 620.

The edge formed by the opening 604 and the top surface 606 comprises a fulcrum 608. By applying a lateral force to the exposed portion of the non-volatile memory device 610, a load is created across the scorings 552, 554, 556 against the fulcrum 608. By a applying an appropriate force, the housing 118, the PCB 112, and the non-volatile memory circuit 114 readily break along the scorings 552, 554, 556. In certain embodiments, the scorings 552, 554, 556 are positioned within the non-volatile memory device 610 such that they form an oblique angle relative to the geometry of the device 610. In other words, the scorings 552, 554, 556, extend transverse to the sides of the device 610. In this manner, the probability that the device 610 will be accidentally damaged in normal use is reduced.

In an alternative embodiment, the lateral force may be applied by a lateral arm (not shown) pivotally connected to the top surface 606. The lateral arm may be used as a lever itself. An operator moves the lateral arm toward the exposed section of the non-volatile memory device 610. When the lateral arm contacts the non-volatile memory device 610, the device 610 receives the force of the lateral arm and readily breaks along the scorings 552, 554, 556.

In another embodiment, an insertion stop 632 is positioned in the opening 604 to further control the insertion depth of the non-volatile memory device 610. The insertion stop 632 may be the bottom of the opening 604 or a separate stop attached to the side of the opening 604 to ensure that the memory device 610, when inserted, is positioned with the scorings 552, 554,556 aligned with the top surface 606 of the leverage tool 620.

Figure 7:
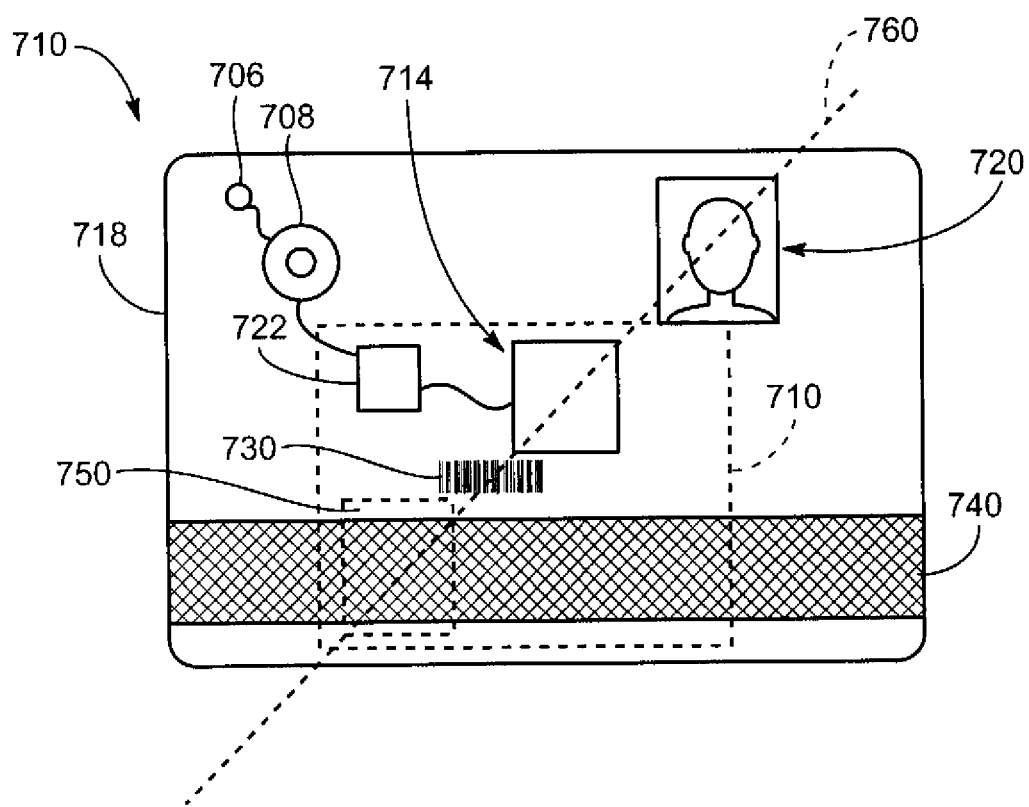
FIG. 7 is a perspective view of one embodiment of an apparatus for deliberately preventing unauthorized access to data stored on a non-volatile memory device configured as a smart card.

FIG. 7 illustrates one embodiment of a non-volatile memory device 710 in accordance with the present invention embodied as a smart card 710. The smart card 710 includes a PCB 712, a non-volatile memory circuit 714, and a housing 718. The PCB 712, non-volatile memory circuit 714, and housing 718 function in substantially the same manner as similar components described in relation to FIGS. 2-5. However, the PCB 712, non-volatile memory circuit 714, and housing 718 are particularly adapted for use in a smart card form factor. For example, the housing 718 may comprise two thin plastic substrates welded or glued together. The non-volatile memory circuit 714 may include user identification and/or authorization data.

Optionally, the smart card 710 may include other identification features such as a photograph 720, an optical encoding feature 730, a magnetically encoded strip 740, an RFID tag 750, and the like. Preferably, one or more of these features 720, 730, 740, 750 are configured with a scoring or pre-stress line that is in alignment with a general scoring line 760. As discussed above, application of minimal pressure (bending the card 710) along the scoring line 760 breaks or disables the features that include the scoring or pre-stress line.

In one embodiment, the card 710 includes an electrical erase circuit 722, power supply 706, switch 708. These components function in substantially the same manner as similar components described above in relation to FIG. 2. In this manner, sensitive data stored in the non-volatile memory circuit 714 can be completely erased when necessary.

Figure 8:
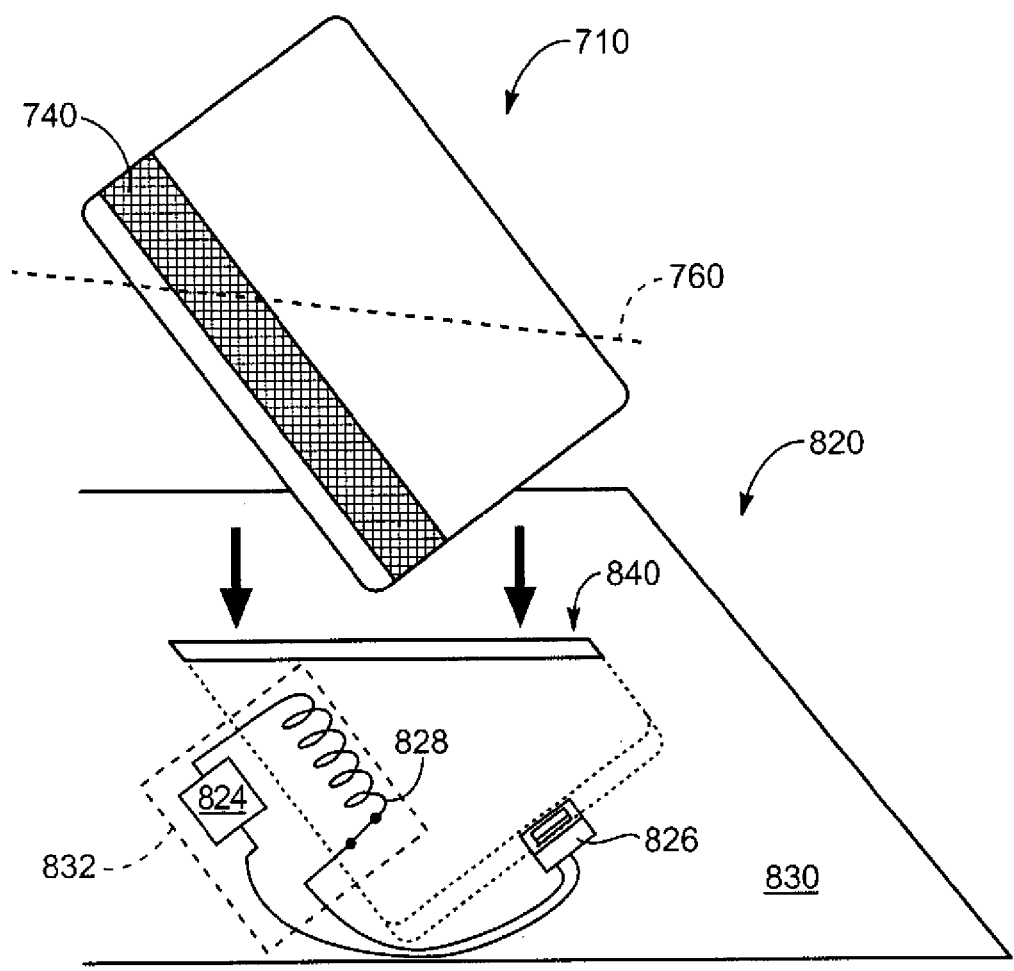
FIG. 8 is a perspective view of one embodiment of a non-volatile memory device configured as a smart card inserted into a leverage tool in accordance with the present invention.

FIG. 8 illustrates an alternative embodiment of a leverage tool 820 configured for use with a smart card 710 in accordance with the present invention. The leverage tool 820 is configured to operate in a similar to that to the leverage tool 620 illustrated in FIG. 6.

The leverage tool 820 includes a top surface 830 having an opening 840 sized and configured to allow the non-volatile memory device 710 to be inserted. Preferably, the opening is angled and of a depth such that insertion of a smart card 710 aligns the score line 760 with the top surface 830 of the tool 820. A lateral force may be applied as described above to break the card 710 along the score line 760.

Additionally, the leverage tool 820 may incorporate an electrical erase circuit 822. The electrical erase circuit 822 may include a power supply 824, a switch 826, and an erase device 828 (coiled wire, or magnetic pole). In one embodiment, the electrical erase circuit 822 comprises an electromagnet 832. The electromagnet 832 may be of sufficient strength to erase data on a magnetic strip 740 at about the same time as the card 710 is physically destroyed. The switch 826 may sense the insertion of a card 710 and energize the electromagnet 832. Alternatively, a permanent magnet may be used in place of the electromagnet 832. Preferably, the opening 840 is deep enough to position all of the magnetic strip 740 in close proximity to the erase device 828.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for deliberately preventing unauthorized access to data stored in a non-volatile memory, the system comprising:
    a host computer;
    a computer interface connected to the host computer for accessing data;
    a non-volatile memory device configured to store and retrieve data from the host computer through the computer interface, the non-volatile memory device comprising
        a printed circuit board (PCB);
        a non-volatile memory chip electrically connected to the PCB, said memory chip comprising a first scoring, the non-volatile memory chip manufactured with the first scoring, the first scoring positioned on the non-volatile memory chip to allow the memory chip to readily break along the first scoring in response to an external force, wherein the first scoring is positioned such that breaking the non-volatile memory circuit along the first scoring renders the non-volatile memory chip inoperable and inhibits retrieval of data from the non-volatile memory chip;
        a housing configured to house the PCB; and
        tabs attached to an outer surface of the housing and positioned to control the insertion depth of the memory device into an opening to ensure desired alignment of the scorings and the top surface; and
    a leverage tool having a top surface and an opening configured to receive the non-volatile memory device readily such that the application of the external force to the non-volatile memory device creates a leveraged load causing a break across the first scoring,
    wherein the PCB comprises a second scoring aligned with the first scoring such that the PCB readily breaks along the second scoring in response to the external force, wherein breaking the PCB renders the PCB inoperable, and wherein the housing comprises a third scoring aligned with the first scoring such that the housing readily breaks along the third scoring in response to the external force.

2. The system of claim 1, wherein the top surface comprises a fulcrum and the opening is configured to align the first, second, and third scorings with the fulcrum such that the application of the external force to the non-volatile memory device creates a leveraged force that separates the scorings at the fulcrum.

3. The system of claim 1, wherein the opening and the housing are jointly keyed to permit a single orientation of the housing during insertion into the opening.

4. The system of claim 1, wherein the non-volatile memory chip is disposed on and attached to the PCB.

5. The system of claim 1, wherein the second scoring is positioned at a same distance as the first scoring along a length of the housing.

6. The system of claim 1, wherein the third scoring is positioned at the same distance as the first and second scorings along a length of the housing.

7. The system of claim 1, wherein the non-volatile memory chip comprises an electrically-erasable programmable read only memory (EEPROM) chip.

8. The system of claim 1, wherein the non-volatile memory chip comprises a flash memory chip.

9. The system of claim 1, wherein the non-volatile memory device comprises a universal serial bus (USB) key.

10. An apparatus for deliberately preventing unauthorized access to data stored on a non-volatile memory device, the apparatus comprising:
    a non-volatile memory chip comprising a first scoring, the non-volatile memory chip manufactured with the first scoring, the first scoring positioned on the non-volatile memory chip such that the non-volatile memory chip readily breaks along the first scoring in response to an external force, wherein the first scoring is positioned such that breaking the non-volatile memory along the first scoring renders the non-volatile memory inoperable and inhibits retrieval of data from the non-volatile memory chip;
    a planar housing configured to support the non-volatile memory chip, the housing comprising a second scoring aligned with the first scoring, the first scoring and second scoring running transverse to the edges of the housing; and
    tabs attached to an outer surface of the housing and positioned to control insertion depth of the memory device into an opening, wherein the tabs align with the first and second scorings to facilitate breaking the memory device at the first and second scorings when the memory device is inserted into the opening to a depth of the tabs and a force perpendicular to the opening is applied to a portion of the memory device external to the opening, wherein the opening is sized to accept the housing of the memory device below the tabs and comprises a rigid material to oppose the force applied to the memory device.

11. The apparatus of claim 10, wherein the second scoring is positioned at a same distance as the first scoring along a length of the housing.

12. The apparatus of claim 11, wherein the non-volatile memory chip is disposed on and attached to a PCB, wherein the PCB comprises a third scoring positioned at the same distance as the first and second scorings along the length of the housing such that the PCB and the housing readily break along the third scoring in response to the external force.

13. The apparatus of claim 10, wherein the non-volatile memory chip comprises an EEPROM chip.

14. The apparatus of claim 10, wherein the non-volatile memory chip comprises a flash memory chip.

15. The apparatus of claim 10, wherein the non-volatile memory device comprises a universal serial bus (USB) key.

16. A system for deliberately preventing unauthorized access to data stored in a non-volatile memory, the system comprising:
- a host computer;
- a computer interface connected to the host computer for accessing data;
- a non-volatile memory device configured to store and retrieve data from the host computer through the computer interface, the non-volatile memory device comprising a printed circuit board (PCB), a non-volatile memory chip electrically connected to the PCB, said memory chip comprising a first scoring configured to allow the memory chip to readily break along the first scoring in response to an external force, wherein breaking the non-volatile memory circuit along the first scoring renders the non-volatile memory circuit inoperable, and a housing configured to house the PCB; and
- a leverage tool having a top surface and an opening configured to receive the non-volatile memory device readily such that the application of the external force to the non-volatile memory device creates a leveraged load causing a break across the first scoring;

wherein the PCB comprises a second scoring aligned with the first scoring such that the PCB readily breaks along the second scoring in response to the external force, wherein breaking the PCB renders the PCB inoperable, and wherein the housing comprises a third scoring aligned with the first scoring such that the housing readily breaks along the third scoring in response to the external force; and tabs attached to an outer surface of the housing and positioned to control the insertion depth of the memory device into the opening to ensure desired alignment of the scorings and the top surface.

* * * * *